United States Patent Office 3,294,734
Patented Dec. 27, 1966

3,294,734
AMINE STABILIZED TRIOXANE COPOLYMERS
Heinz Schmidt and Günther Roos, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 10, 1962, Ser. No. 186,342
Claims priority, application Germany, Apr. 13, 1961, F 33,651
4 Claims. (Cl. 260—45.9)

The present invention relates to a process for stabilizing trioxane copolymers.

Polyacetals are polymers containing the following structural unit:

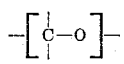

in which there are bound to the carbon atom preferably two hydrogen atoms or a hydrogen atom and an alkyl radical having 1 to 4 carbon atoms which may be substituted, preferably by fluorine or chlorine atoms.

Various processes are known for the manufacture of macromolecular polyacetals by anionic or cationic polymerization. Alternatively, aldehydes and cyclic acetals, such as trioxane, can be copolymerized with formals, for example diethylene glycol formal, dioxolane, butane-diol formal, butene-diol formal and diallyl formal, or with cyclic ethers, for example ethylene oxide, oxacyclobutane and tetrahydrofurane, or with cyclic acetals from dialcohols with higher aldehydes, for example ethylene glycol crotonal. It is possible, for example, to prepare copolymers from 90 to 99% of trioxane and 10 to 1% of diethylene glycol formal or butane-diol formal according to the process described in Belgian Patent No. 591,716.

Under the action of higher temperatures, as occurring in the treatment of polyacetals in customary thermoplastic-processing machines, acetal homopolymers as well as acetal copolymers are more or less unstable and tend to depolymerization and chain cleavage and form monomeric aldehydes and secondary products of these aldehydes.

The above-mentioned copolymers contain in the macromolecular chain, besides the acetal linkages, ether linkages and have, therefore, a higher thermostability than acetal homopolymers, without their thermostability being sufficient for the requirements of practice.

It has already been proposed to stabilize acetal homopolymers against the action of heat by using hydrazine and thiourea derivatives, polyamides and dicarboxylic acid amides. There have been described in Belgian Patent No. 591,578 special amines and hydrazines such as tris-acetoxy - ethylamine, N -acetoxy - ethyl - N,N - di - butylamine, phenylhydrazone of p-dimethylamino-benzaldehyde and other compounds of this type.

The intention of using the aforesaid compounds has been to bind the aldehydes and their secondary products, to block the active centers appearing in the polymer and to prevent depolymerization. The polyacetals are even more unstable against the combined action of heat and oxygen. The stabilizers which have hitherto been used to avoid such oxidative degradation of polyacetals include, for example, aromatic amines, phenols, organic compounds containing sulfur and nitrogen atoms in their molecule, for example thiodiazoles, and organic mono- and polysulfide compounds.

It has also been known that polyacetals can be stabilized against light by using compounds of the benzophenone or acetophenone type.

It has now been found that macromolecular copolymers of trioxane and formals or cyclic ethers, such as diethylene glycol formal, dioxolane, butane-diol formal, butene-diol formal, diallylformal, ethylene oxide, oxacyclobutane and tetrahydrofurane, more especially copolymers from 90 to 99% of trioxane and 10 to 1% of cyclic formals or cyclic ethers, can be stabilized against the action of heat and oxygen by adding to the polymers 0.1 to 10% by weight and preferably 0.5 to 5% by weight, calculated on the polymer, of secondary aliphatic amines of the general formula

wherein $R_1$ and $R_2$ represent identical or different alkyl, alkenyl, aralkyl, alkylnitrile, alkylaminoalkyl, alkylaminoalkenyl, alkylamide or alkenylamide radicals having 2 to 20 carbon atoms or radicals of the general formula

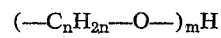

in which $n$ is a whole number in the range of 2 to 10 and $m$ stands for a whole number in the range of 1 to 9.

The above compounds can be used either alone or in admixture with one another.

Especially effective stabilizers are, for example, bis-stearylamine, N-α-naphthylmethyl-N-stearylamine, cyanoethyl-oleylamine, n-propylstearylamine, ethyloleylamine, N - α - naphthylmethyl - N - oleylamine, N,N' - distearyl-ethylene-diamine, cyanoethylstearylamine and N,N'-dioleylethylenediamine. However, the scope of the present invention is not limited to these stabilizers. They are considerably more effective than tertiary amines, for example an amine of the formula:

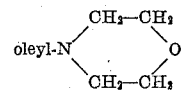

The compounds to be used in accordance with the invention are especially suitable for stabilizing copolymers made from 95 to 99% of trioxane and 5 to 1% of diethylene glycol formal, butane-diol formal or ethylene oxide. They have no stabilizing action on trioxane homopolymers, on the contrary, they decompose them (cf. the following Examples 1 and 2).

The activity of the above-defined stabilizers can be further enhanced by adding 0.1 to 10% by weight, preferably 0.5 to 5% by weight, calculated on the polymer, of a known antioxidant, advantageously a phenol, for example methoxynonyl phenol, 2,6-dimethylol-p-cresol, 2,2'-dihydroxy - 3,3' - di - tertiary butyl - 5,5' - dimethyl - diphenylmethane, and the condensation product from acetone and nonyl phenol.

Especially stable products of very good utility can be obtained by incorporating a known light stabilizer with the acetal copolymers stabilized according to this invention.

The use of macromolecular polyacetals as plastic materials necessitates their having a sufficient stability for treatment in the thermoplastic state and the shaped articles made therefrom must be stable against the action of heat, oxygen and light without undergoing degradation or becoming brittle. Especially in the treatment of polyacetals on the customary thermoplastic-processing machines these products have the tendency to decompose with the formation of aldehydes and the secondary products thereof. The pressure of the gaseous decomposition products, for example in the cylinder of an injection molding machine, may become so high that the plastic mass is ejected from the cylinder and blistery articles are obtained that are useless.

The stabilizers of the invention serve to suppress or to avoid depolymerization of the polyacetals in their treatment and to bind the aldehyde and its secondary products formed in the decomposition. Thus they are intended, above all, for improving the processing stability.

To measure this processing stability, which is equivalent to thermostability, the following test conducted under practice conditions was used to determine the time after which the polymer started depolymerization. In this test the behavior of the plastic mass corresponded substantially to that observed in thermoplastic processing, for example in the cylinder of an injection molding machine. The testing device was an apparatus of the type used for the determination of the melt index of thermoplastic masses according to ASTM–1238–52T. The apparatus comprised a heated metal cylinder with a cylindrical bore hole 9.5 mm. wide into which a nozzle with a bore hole 2 mm. wide could be inserted, which nozzle was fixed in the lower part of the cylinder. Into the cylindrical bore hole of the metal cylinder fitted a punch 9.5 mm. wide which could be removed freely and loaded with 2 kg. or 5 kg. The cylinder while being maintained at a constant temperature of 210° C. was charged with the individual acetal copolymers admixed with the above defined stabilizers and the polyacetals were stamped. The punch was put in place without load and the time was determined after which gas evolution was observed. By means of a metal locking bar disposed at the lower end of the cylinder the nozzle in the lower portion of the cylinder had been closed. The gases evolved on depolymerization pressed the punch upward and thus indicated the commencing decomposition.

The degree of thermal degradation was determined by measuring the change in the flow behavior of the melt. After a time of residence of the samples in the apparatus of 5 and 30 minutes, respectively, at 210° C. the melt index $i_2$ was determined in known manner. The weight in grams of the melt was determined which was forced through the nozzle during the course of 10 minutes under a load of 2 kg. The quotient $i_2$ (30 minutes):$i_2$ (5 minutes) indicates a number which is characteristic of the degree of thermal degradation. The plastic mass flowing off during the determination of the melt index was examined for the formation of blisters.

The stabilizers used in the present invention can be admixed with the macromolecular copolymers in known manner. The dry stabilizers can be intimately mixed with the polyacetals in an intensive mixer or incorporated with the plastic mass at elevated temperature in a kneader. Still further, the stabilizers may be added to the polyacetals as solution in a solvent. An especially homogeneous distribution of the stabilizer is achieved by adding the solution of the stabilizer in a solvent to the polyacetal while stirring and then evaporating the solvent in a current of hot nitrogen while stirring. The stabilizer and the polyacetal may likewise be suspended in a solvent and the solvent may be evaporated in a hot current of nitrogen, while stirring.

The present invention enables copolymers of trioxane and cyclic formals or cyclic ethers containing terminal hydroxyl groups or terminal ether groups to be stabilized.

The following examples serve to illustrate the invention but they are not intended to limit it thereto, the parts being by weight unless otherwise stated and the percentages are percent by weight calculated on the polymer unless otherwise stated.

The tendency to depolymerization and the melt index of the copolymers admixed with the individual stabilizers were determined at 210° C. in an apparatus for measuring the melt index and the quality of the melt was examined as to the formation of blisters. Press plates having a thickness of 0.5 mm. were made from the individual powder mixtures (at 190° C. under a pressure of 50 kg./cm.² and 100 kg./cm.² on cooling). The age resistance to heat of the copolymers was determined by heating the plates at 120° C. in a heating cabinet. The following table indicates the values found as well as corresponding comparison values for unstabilized copolymers and unstabilized and stabilized trioxane homopolymers.

For characterizing the stability there were also determined the losses in weight of the samples per minute when heated in a nitrogen current at 220° C. The stability to alkali was determined by measuring the loss in weight of the samples when kept for several hours at 100° C. in sodium hydroxide solution of 10% strength.

*Example 1*

100 parts of an acetal copolymer obtained by polymerizing 97 parts of trioxane and 3 parts of diethylene glycol formal as described in Belgian Patent 591,716 and having a specific viscosity $\eta_{red}$ of 0.7 dl./g., determined with a 0.5% solution of the polymer in butyrolactone at 140° C. with the addition of 2% of diphenylamine as stabilizer, were mixed, while stirring, with 2 parts of cyanoethyloleylamine in 100 parts of acetone. The acetone was removed while stirring the product at 80° C. in a nitrogen current. The product freed from acetone was then kept for 2 hours at 70° C. in a vacuum drier. The polyacetal admixed with the stabilizer was tested as described above. The tendency to depolymerization was determined at 210° C. in the apparatus defined above. For testing the age resistance to heat 0.5 mm. thick press plates of the stabilized copolymer were kept in a warming cabinet at 120° C. and the time was determined after which the press plates broke on bending. The thermostability was determined by the loss in weight of the stabilized copolymer at 220° C. in a nitrogen atmosphere. The resistance to alkali was determined by the loss in weight a sample of the stabilized copolymer underwent when kept for several hours at 100° C. in sodium hydroxide solution of 10% strength with regard to the water absorption. The results obtained are indicated in the following table in comparison with the results obtained for the same unstabilized copolymer, for an unstabilized homopolymer of trioxane which had a specific viscosity $\eta_{red}$ of 0.71 dl./g. and for a homopolymer of trioxane which had been stabilized in the same manner as the copolymer with 2 parts of cyanoethyloleylamine.

*Example 2*

The copolymer defined in Example 1 was admixed with 2 parts of N,N'-dioleylethylene-diamine in 100 parts of acetone, treated as described in the preceding example and tested. The results obtained are indicated in the following table in comparison with the results obtained for a trioxane homopolymer which had been stabilized in the same manner.

*Examples 3 and 4*

The copolymer defined in Example 1 was mixed, as described in Example 1, with 2 parts of bis-stearylamine and 2 parts of N-α-naphthylmethylstearylamine, respectively. The results obtained are given in the following table.

*Example 5*

An acetal copolymer obtained by polymerizing 98 parts of trioxane and 2 parts of ethylene oxide as described in U.S. patent application Serial No. 152,666 filed Nov. 15, 1961, now U.S. Patent 3,219,631 and having a specific viscosity $\eta_{red}$ of 0.8 dl./g. was mixed with two parts of distearylamine as described in Example 1. The results obtained are indicated in the following table.

*Examples 6 and 7*

The copolymer defined in Example 5 was mixed, as described in Example 1, with 2 parts of cyanoethyloleylamine and 2 parts of N-α-naphthylmethylstearylamine, respectively, and tested. The results are indicated in the following table.

DEPOLYMERIZATION, MELT INDEX, EMBRITTLEMENT AND ALKALI STABILITY OF PRESS PLATES OF VARIOUS STABILIZED COPOLYMERS ON THE BASIS OF TRIOXANE

| Ex. No. | Polymer | Stabilizer | Decomposition at 210° C. | i₂ (30 min.)/ i₂ (5 min.) | Melt | Time of embrittlement at 120° C. days | Loss in weight at 220° C. under N₂ percent per min. | Loss in weight in 10% NaOH at 100° C. with regard to water absorption | | |
|---|---|---|---|---|---|---|---|---|---|---|
| | | | | | | | | 1 hr. | 2 hrs. | 4 hrs. |
| 1 | Trioxane homopolymer. | | Little to moderate. | 2.3 | Some blisters | 2 | 0.25 | 8.8 | 17.5 | 36.1 |
| | do | 2 wt. percent cyanoethyloleylamine. | Strong | 1.5 | Foamy | (¹) | 0.39 | 6.6 | 13.4 | 49.0 |
| | Trioxane/diethylene glycol formal copolymer. | | Little, after 20' very little. | 2.4 | Some blisters | 6-8 | 0.38 | 1.2 | 1.6 | 2.4 |
| | do | 2 wt. percent cyanoethyloleylamine. | Extremely little. | 1.0 | No blisters | 10 | 0.14 | 0.6 | 0.9 | 1.6 |
| 2 | Trioxane homopolymer. | 2 wt. percent N,N'-dioleylethylenediamine. | Very strong | 2.9 | Foamy | (¹) | 0.54 | 3.2 | 14.1 | 43.6 |
| | Trioxane/diethylene glycol formal copolymer. | do | Very little | 2.0 | Few blisters | 14 | 0.23 | 1.1 | 1.2 | 1.6 |
| 3 | do | 2 wt. percent bis-stearylamine. | Extremely little. | 1.0 | do | 14 | 0.14 | 1.0 | 1.0 | 1.0 |
| 4 | do | 2 wt. percent naphthylmethylstearylamine. | Little, after 10' extremely little. | 1.0 | do | 16-18 | 0.13 | 1.2 | 1.2 | 1.3 |
| 5 | Trioxane/ethylene oxide copolymer. | 2 wt. percent bis-stearylamine. | Very little | 1.3 | do | 24 | 0.11 | 0.5 | 0.7 | 0.9 |
| 6 | do | 2 wt. percent cyanoethyloleylamine. | Extremely small. | 1.7 | No blisters | 20-22 | 0.08 | 0.9 | 0.9 | 1.2 |
| 7 | do | 2 wt. percent N-α-naphthylmethyl-N-stearylamine. | Very little | 1.1 | do | 18 | 0.10 | 1.0 | 1.3 | 1.7 |

¹ Broke at once.

We claim:

1. Composition of matter consisting essentially of (A) 90 to 99.9% of a copolymer of 90 to 99% of trioxane with 10 to 1% of at least one member selected from the group consisting of diethylene glycol formal, dioxolane, butane-diol formal, butene-diol formal, diallyl formal, ethylene oxide, oxacyclobutane and tetrahydrofurane, and (B) 0.1 to 10% by weight, calculated on the copolymer, of at least one secondary amine of the formula $$R_1-NH-R_2$$

wherein $R_1$ and $R_2$ stand for members selected from the group consisting of $(-C_nH_{2n}-O)_mH$, in which $n$ is a whole number of 2 to 10 and $m$ is a whole number of 1 to 9, and 2 to 20 carbon atoms alkyl, alkenyl, aralkyl, alkylnitrile, alkylaminoalkyl and alkylaminoalkenyl radicals.

2. Composition of matter consisting essentially of (A) 90 to 99.9% of a copolymer of 95 to 99% of trioxane with 5 to 1% of diethylene glycol formal and (B) 0.1 to 10% by weight, calculated on the copolymer, of at least one secondary amine of the formula $$R_1-NH-R_2$$

wherein $R_1$ and $R_2$ stand for members selected from the group consisting of $(-C_nH_{2n}-O)_mH$, in which $n$ is a whole number of 2 to 10 and $m$ is a whole number of 1 to 9, and 2 to 20 carbon atoms alkyl, alkenyl, aralkyl, alkylnitrile, alkylaminoalkyl and alkylaminoalkenyl radicals.

3. Composition of matter consisting essentially of (A) 90 to 99.9% of a copolymer of 95 to 99% of trioxane with 5 to 1% of butane-diol formal and (B) 0.1 to 10%, calculated on the copolymer, of at least one secondary amine of the formula $$R_1-NH-R_2$$

wherein $R_1$ and $R_2$ stand for members selected from the group consisting of $(-C_nH_{2n}-O)_mH$, in which $n$ is a whole number of 2 to 10 and $m$ is a whole number of 1 to 9, and 2 to 20 carbon atoms alkyl, alkenyl, aralkyl, alkylnitrile, alkylaminoalkyl and alkylaminoalkenyl radicals.

4. Composition of matter consisting essentially of (A) 90 to 99.9% of a copolymer of 95 to 99% of trioxane with 5 to 1% of ethylene oxide and (B) 0.1 to 10%, calculated on the copolymer, of at least one secondary amine of the formula $$R_1-NH-R_2$$

wherein $R_1$ and $R_2$ stand for members selected from the group consitsing of $(-C_nH_{2n}-O)_mH$, in which $n$ is a whole number of 2 to 10 and $m$ is a whole number of 1 to 9, and 2 to 20 carbon atoms alkyl, alkenyl, aralkyl, alkylnitrile, alkylaminoalkyl and alkylaminoalkenyl radicals.

References Cited by the Examiner

UNITED STATES PATENTS

| 2,395,265 | 2/1946 | Gresham | 260—45.9 |
| 2,734,889 | 2/1956 | Starr et al. | 260—45.9 |
| 2,768,994 | 10/1956 | MacDonald | 260—45.9 |
| 3,112,280 | 11/1963 | Farthing | 260—67 |
| 3,131,165 | 4/1964 | Herman et al. | 260—45.9 |
| 3,133,896 | 6/1964 | Dolce et al. | 260—45.9 |
| 3,173,894 | 3/1965 | Herman et al. | 260—45.9 |

FOREIGN PATENTS 425,728   3/1935   Great Britain.

DONALD E. CZAJA, *Primary Examiner.*

LEON J. BERCOVITZ, *Examiner.*

H. E. TAYLOR, *Assistant Examiner.*